United States Patent [19]

Vasilos et al.

[11] Patent Number: 4,582,751

[45] Date of Patent: Apr. 15, 1986

[54] OXIDATION PROTECTION FOR CARBON COMPOSITE MATERIALS

[75] Inventors: Thomas Vasilos, Winthrop; Richard D. Webb, Wellesley, both of Mass.

[73] Assignee: Avco Corporation, Wilmington, Mass.

[21] Appl. No.: 646,943

[22] Filed: Sep. 4, 1984

[51] Int. Cl.⁴ ............... B32B 33/00; C09K 15/32; C23C 11/08
[52] U.S. Cl. ............... 428/307.3; 427/248.1; 427/255.1; 428/319.1; 428/408
[58] Field of Search ............ 427/255.1, 248.1; 428/307.3, 319, 408

[56] References Cited

U.S. PATENT DOCUMENTS

| | | | |
|---|---|---|---|
| 3,925,577 | 12/1975 | Fatzer et al. | 428/408 |
| 4,101,354 | 7/1978 | Shaffer | 428/365 |
| 4,119,189 | 10/1978 | Ehrenreich | 428/408 |
| 4,321,298 | 3/1982 | Shaffer et al. | 428/242 |
| 4,439,491 | 3/1984 | Wilson | 428/408 |
| 4,461,806 | 7/1984 | Ikeda et al. | 428/408 |
| 4,465,777 | 8/1984 | Shuford | 428/408 |
| 4,470,479 | 9/1984 | Inoue et al. | 427/248.1 |
| 4,476,164 | 10/1984 | Veltri et al. | 428/408 |
| 4,500,602 | 4/1985 | Patten et al. | 428/408 |
| 4,530,853 | 7/1985 | Lewallen et al. | 428/408 |

*Primary Examiner*—James C. Cannon
*Attorney, Agent, or Firm*—Abraham Ogman

[57] ABSTRACT

Carbon composite materials of increased resistance to oxidation are produced by heating a porous carbon composite material to an elevated temperature in a reaction chamber and introducing into said chamber a gas mixture comprising a decomposable boron-containing gas and a diluent and effecting deposition of boron as a solid on the walls of the pores of said composite as a consequence of said boron-containing gas decomposing.

23 Claims, 4 Drawing Figures

OXIDATION PROTECTION FOR CARBON COMPOSITE MATERIALS

DESCRIPTION

1. Field of the Invention

This invention is in the field of chemistry and relates to carbon composite materials. More specifically, it relates to a method for providing oxidation resistance in such materials by the addition of boron.

2. Background Art

Carbon composites are materials comprised of a fibrous carbon material such as carbon or graphite fibers woven into a porous skeleton and a nonfibrous carbon matrix in the pores. They are strong materials which can be shaped and machined with relative ease and, in the absence of oxygen, are high-temperature resistant. An unusual characteristic of carbon composite materials is that in the absence of oxygen, their strength increases with increasing temperature, up to about 5000° F. In the presence of oxygen, however, the carbon composite undergoes oxidation, and, as a result, the strength of the composite material is decreased.

One context in which a material capable of withstanding high temperatures is necessary is in airplane turbine engines, where fuel combustion temperatures are about 4000° F. Metallic turbine engine components approach their maximum high temperature use limit at approximately 2000° F. Increasing temperature results in decreasing strength of these components and temperatures above about 2000° F. cause them to bend and buckle. This means only nominal increases above this temperature are possible. As a result, elaborate cooling systems have been required to protect metallic components and to prevent catastrophic failure. Air or water cooling systems increase engine weight and fabrication costs and consequently decrease fuel efficiency.

Monolithic ceramics are a type of material being studied as substitutes for metallic turbine engine components and some, such as silicon carbide and silicon nitride ceramics, could extend turbine material temperatures to 2500° F. or possibly 3000° F. However, one critical limitation must be overcome before monolithic ceramics will prove useful: the difficult fracture-toughness problem inherent in the use of such materials. Such materials are able to withstand stress to an upper limit determined largely by the materials' internal and external flaws. Once that stress limitation is exceeded, these brittle materials break or fracture precipitously and relieve themselves of further strain. S. W. Freiman, "A critical evaluation of fracture mechanics techniques for brittle materials," in *Fracture Mechanics of Ceramics*, Vol. b 6, R. C. Bradt et al. (ed.), Plenum Press. If this problem can be resolved, monolithic ceramics may be of use in aviation technology.

Carbon composites have great potential for use as turbine engine components because they exhibit several properties valuable in such an application. They are strong materials, are of low density (and thus can be made into lightweight engine components) and exhibit fracture toughness. In contrast to monolithic ceramics, carbon composite materials which are stressed do not fracture precipitously. Instead, some of the reinforcements of the composite break but others do not. The composite continues to accept stress at a lower level and strains until it ultimately fails. As mentioned above, an unusual characteristic of such composites is that their strength increases with increasing temperature. Increase in strength with increasing temperature occurs up to and beyond the fuel combustion temperature of about 4000° F. In addition, carbon composites are made of non-strategic raw materials.

Conventional carbon composite materials, however, have limited applicability because of their poor oxidation resistance at elevated temperatures. When subjected to high temperatures in the presence of oxygen, oxidation of the carbon occurs, which results in weakening of the material and ultimately loss of structural integrity. Application of a silicate-based coating to the surface of carbon composite materials has proved useful in reducing oxidation. This method provides only limited protection against oxidation, however, because cracks or breaks develop in the coating or the coating peels off as the materials are exposed to temperature gradients. This allows passage of oxygen, which attacks the underlying carbon composite material.

Boron has been used in the manufacture of reinforced carbon and graphite articles (carbon composites) to enhance oxidation resistance. Ehrenreich in U.S. Pat. No. 4,119,189 (1978) discloses a reinforced carbon article made of a carbon fiber shape which is pressure impregnated with a carbonizable binder and contains a friction modifier, e.g., the in situ reaction product of carbon and a boron-containing compound. The Ehrenreich carbon articles are claimed to exhibit improved oxidation resistance as compared to conventional reinforced carbon articles. Ehrenreich also discloses a process for making such an article. A step in the process is dispersing a boron-containing additive, in the form of finely divided particles, between the layers as the fibrous shape is produced.

Vasilos, U.S. Ser. No. 426,600, "Oxidation-Resistant Carbon/Carbon Composites", (filed 9/29/82), discloses the mixing of boron or boron carbide particles with the carbon before the carbon composite material or preform is formed. During the formation of the preform, the boron is vaporized and, as a result, distributed throughout the preform.

Shaffer, U.S. Pat. No. 4,321,298 (1982), discloses fibrous carbon materials coated sequentially with a thermosetting resin containing a refractory metal capable of reacting with boron and with a boron-containing thermosetting resin. Each step is followed by curing, a number of layers is assembled and the resulting laminate is heated at a high temperature to carbonize the resin. The resultant carbon composites are claimed to be more resistant to oxidation than composites without the refractory metal in the thermosetting resin.

Silicon carbide (SiC) has also been used to improve resistance of carbon composites to oxidation. Christin and co-workers teach the application of chemical vapor deposition (CVD) infiltration into carbon composites for the purpose of enhancing resistance of the composites to oxidation at elevated temperatures (1000° C.–1500° C.). Lower temperature (up to 900° C.–1100° C.), lower total pressure (up to 0.1 atm.–0.6 atm.) and lower gas flow rate than used in standard SiC-deposition procedures are described. F. Christin, et al. "A Thermodynamic and Experimental Approach of Silicon Carbide—CVD Application to the CVD Infiltration of Carbon-Carbon Composites." Proceedings of the 7th Internation Conference on Chemical Vapor Deposition. 499–506. (1979). Porous composites (open porosity about 25–30 vol. %) were alleged to exhibit enhanced oxidation resistance and in-depth deposition, each pore receiving a homogenous layer of SiC, as a result of the CVD process. Analyses showed that the deposit within the pores was almost pure SiC and that deposit composition did not vary from the center to the surface of the substrate.

In U.S. Pat. No. 3,925,577 (1975), Fatzer et al. teach the use of silicon to coat the surface of high density, fine pored graphite members. Upon heating, the silicon melts, penetrates into the graphite pores and an in situ reaction with the graphite occurs to form a layer of silicon carbide to a depth of at least 5 mils. A sealing layer of silicon carbide is also applied. The resulting coated graphite members are said to have a variety of chemical and thermal applications.

Although carbon composite materials have great strength at elevated temperatures if oxygen is not present, their strength and utility are rapidly diminished if oxidation can occur. Surface coating methods presently used to protect such composites from oxidation are unsatisfactory because the coatings do not withstand the temperature gradients to which they are exposed. Once the coating has been broken, the underlying carbon composite material is vulnerable to oxidation. Additional protection, in the form of an oxidation inhibitor in the pores of the composite material, would provide increased resistance to oxygen's deleterious effects because the pores are the route through which oxygen passes in an attack upon the material.

DISCLOSURE OF THE INVENTION

This invention relates to a method of introducing oxidation inhibitors into carbon composite materials for the purpose of providing protection from oxidation, and to the materials produced by the use of this method. The method developed for achieving infiltration of such inhibitors is a chemical vapor infiltration process in which a carbon composite material is heated to a temperature between about 900° C. and 1200° C. in a vacuum or inert atmosphere. A gas mixture containing the oxidation inhibitor (e.g., boron in the form of boron trichloride) and hydrogen is introduced into the chamber which contains the heated composite. The temperature of this mixture is lower than the temperature of the carbon composite. In addition, the pressure of the boron-containing gas is maintained at a sufficiently low level, to prevent reaction of the boron on or very close to the surface of the carbon composite. The by-product of the reaction between the boron-containing gas and hydrogen are removed by the use of an excess of a diluent gas.

As a result of the conditions under which gases are introduced into the chamber, there is effective infiltration of the oxidation inhibitor into the interior of the carbon composite. Because the temperature of the gaseous reactants is lower than that of the carbon composite, the gas is able to penetrate into the pores of the composite before the temperature of the gas is elevated sufficiently for it to decompose. Because the partial pressure of the boron-containing gas is maintained at a low level, the surface pores do not become filled with the boron and the gas is able to penetrate into the interior of the composite. As a result, boron is deposited as a solid on the walls of the pores of the composite material. Thus, the invention allows dispersion of the oxidation inhibitor to those areas where it is most likely needed, i.e., the pores of the composite through which oxygen would pass in an attack on the material.

The relatively low temperatures used in the process also prevent chemical attack of carbon fibers of the composite by boron. At higher temperatures, e.g., those necessary for graphitization, the fibrous carbon material is attacked by the boron. This reaction between carbon and boron causes a decrease in tensile strength in the direction of the fibers. As a result, the carbon composite material treated by the method of this invention exhibits greater strength than boron-containing composites processed at higher temperatures.

The method of this invention may be used in conjunction with subsequent application of a surface coating of a silicon-based material applied to according to methods known to those skilled in the art.

BEST MODE OF CARRYING OUT THE INVENTION

Figure 1:
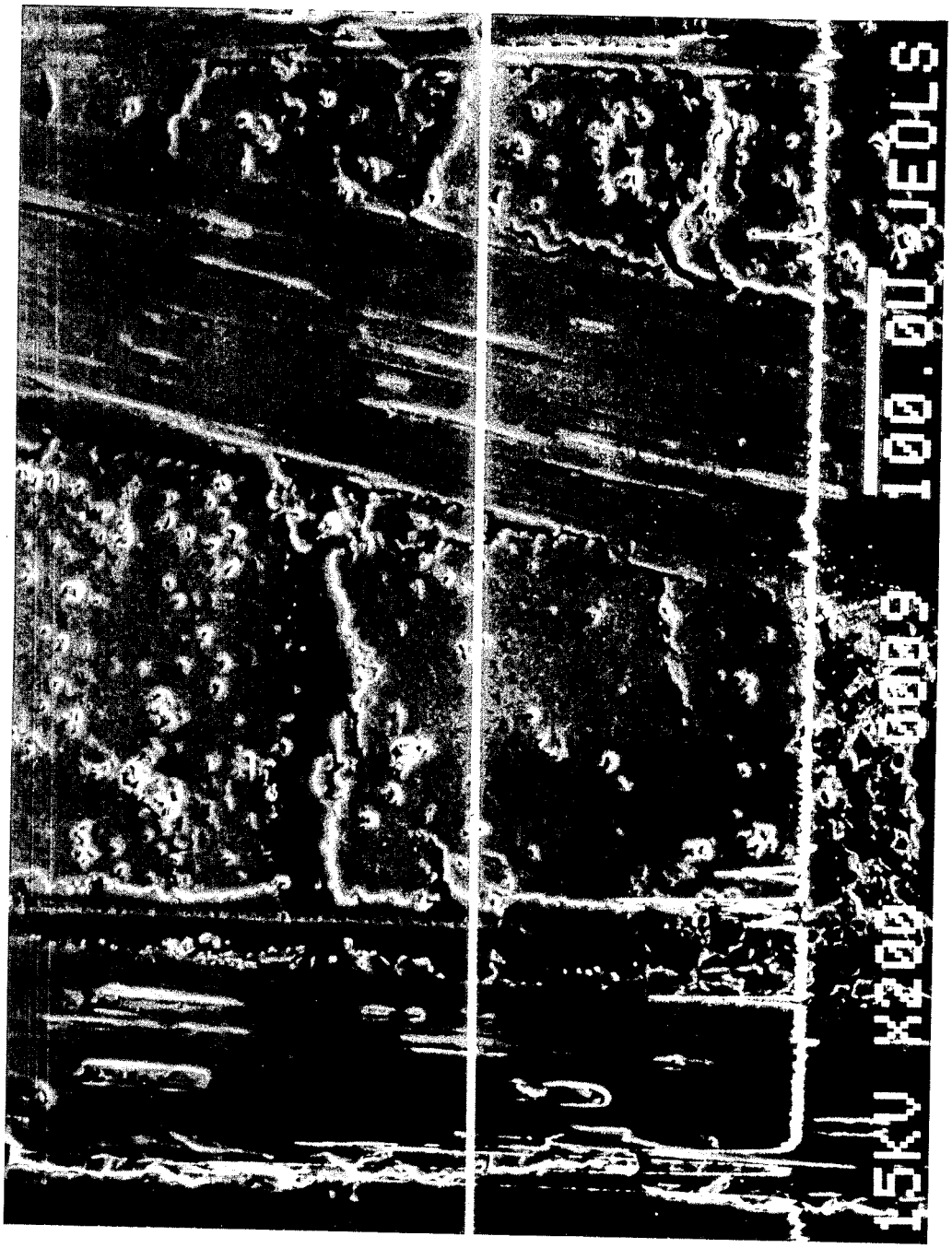
FIG. 1 is a Scanning Electron Microscopy (SEM) cross-section of a CVI processed carbon composite material.

According to the present invention, a method of vapor phase infiltration, more specifically a chemical vapor infiltration (CVI) process, is used to disperse oxidation inhibitors into the pores of carbon composite materials.

In one embodiment of the CVI process, carbon composite material with porosity greater than 25 percent and pore size of greater than one micron is infiltrated with boron to provide protection against oxidation. The carbon composite is heated to a temperature between about 900° C. and 1200° C. in a chemical vapor deposition reactor in a vacuum or inert atmosphere. An excess of a diluent gas, such as hydrogen, is introduced into the chamber while the temperature is lowered to about 1050° C. A gas mixture containing boron trichloride and hydrogen is introduced into the chamber containing the heated composite. The temperature of the gas mixture is lower than the temperature of the carbon composite. The pressure of the boron-containing gas is maintained at a level sufficiently low to prevent reaction of the boron-containing reactants before it can enter the pores of the composite. It is possible to use boron-containing reactants other then boron trichloride to infiltrate the carbon composite. For example, diborane, boron tribromide, or boron trifluoride may be used. Other gases which can be used as the diluent gas include helium, argon or nitrogen.

Because the temperature of the gas mixture is lower than the temperature of the composite and the partial pressure of the reactants is kept at a low level, the gas mixture enters the pores of the composite material. This occurs for at least two reasons: first, the gas is able to enter the pores of the composite before its temperature is elevated sufficiently for it to decompose and second, the relatively low partial pressure means that the surface pores do not become filled with the boron, which instead penetrates into the composite interior. In the interior, a reaction occurs between the gaseous boron trichloride and hydrogen, producing hydrochloric acid in a vapor phase and boron which is deposited on the walls of the pores. The excess inert diluent gas serves to remove the hydrochloric acid by-product from the reaction zone.

The gas flow rates of the boron trichloride and of the hydrogen are adjusted to result in a total pressure of about 800-900 Torr absolute and a boron trichloride partial pressure of less than about 50 Torr. It is to be noted, however, that the method of the present invention is not to be limited to these pressure ranges for total pressure or for boron trichloride partial pressure.

A key consideration in achieving effective infiltration relates to the rate at which the infiltration is carried out. The infiltration (or deposition) rate is determined by the deposition temperature, the partial pressure of the boron trichloride, and the flow rates of the gaseous reactants. A slow infiltration rate, that is, a rate of about one percent by weight per hour or less, is highly desirable. The optimum infiltration rate can be routinely determined for each composite material that is to be infiltrated and the particular vapor to be used in the infiltration process. In general, the more open porosity in a composite the greater the maximum allowable infiltration rate.

The method of the present invention may be carried out in a chemical vapor deposition reactor or other suitable chamber. A chemical vapor deposition reactor is a chamber in which it is possible to simultaneously heat a substrate to a high temperature and introduce a reactant gas flow. However, the process can also be carried out in any chamber in which it is possible to carry out the simultaneous heating of the substrate and introduction of reactant gas flow.

Heating of the composite occurs in two steps. First, heating to a temperature of about 1200° C. under vacuum or inert gas to outgas water vapor and other contaminants from the carbon composite material. Second, maintaining the temperature at a constant level between about 900° C. and 1200° C. to facilitate boron deposition in the pores of the carbon composite. In one embodiment, the temperature is maintained at about 1050° C. during the infiltration process. The use of relatively low temperatures in the method of the present invention allows diffusion of the boron before a reaction occurs between the boron trichloride and the hydrogen.

If the temperature is above approximately 1050° C., the deposition rate of boron is generally less than optimum and the surface pores may become sealed, thus preventing efficient infiltration into the pores of the composite. In addition, the relatively low temperatures prevent chemical attack of the carbon fibers by boron; above 2000° C., the boron and carbon react, with the result that the strength of the composite is compromised. Therefore, the method of the present invention results in carbon composites with greater strength than boron-containing composites processed at higher temperatures.

A large excess of a diluent gas, that is, a quantity sufficient to flush out or remove the by-products of the reaction between the boron-containing gas and hydrogen, is introduced into the chamber containing the heated composite and the gas mixture containing boron trichloride and hydrogen. The diluent gas used may be, for example, hydrogen, helium, argon or nitrogen. If excess diluent gas is not used, the reaction by-product may be removed by vacuum pumping.

The method of the present invention may be carried out in a single cycle or in multiple cycles to achieve the desired boron concentration in the carbon composite material. During an infiltration run, some boron may be deposited on the surface of the carbon composite material and may act as a coating which interferes with the penetration of the chemical vapor into the material being processed. Therefore, if infiltration is accomplished through a series of processing runs, the deposited boron must be removed from the composite surface after regular intervals. The removal or cleaning may be done, for example, by sanding or grinding.

Oxidation protection may also be enhanced by infiltrating carbon composite materials with an oxidation inhibitor according to the method of the present invention and subsequently coating the surfaces of the composite materials with a material such as silicon carbide-based ceramic coatings. Application of these coatings is carried out according to methods known to those skilled in the art.

The carbon composite materials suitable for use with the method of the present invention include those comprised of a fibrous carbon material such as carbon or graphite fibers woven into a porous skeleton and a non-fibrous carbon matrix. Preferably the carbon composite material containing the woven skeleton and carbon matrix is porous, i.e., has a porosity of greater than 25 percent and pore size greater than one micron. However, the composite material need not be so limited and the use of invention is to be understood to refer to porous carbon articles in all its forms, including graphite.

Figure 2:
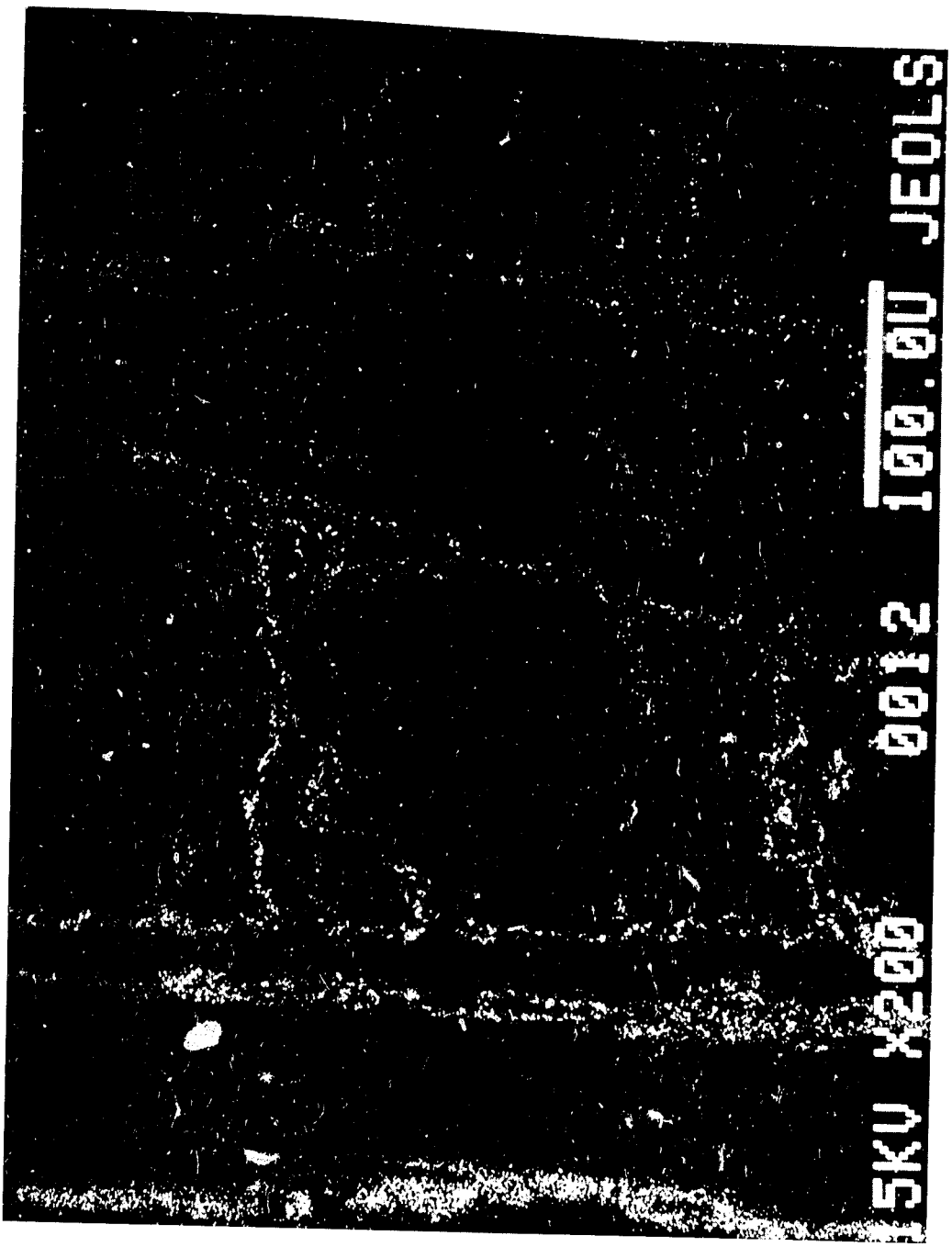
FIG. 2 is a Wavelength Dispersive Spectrometry (WDS) map of the same view of a CVI processed carbon composite showing boron distribution.
Figure 3:
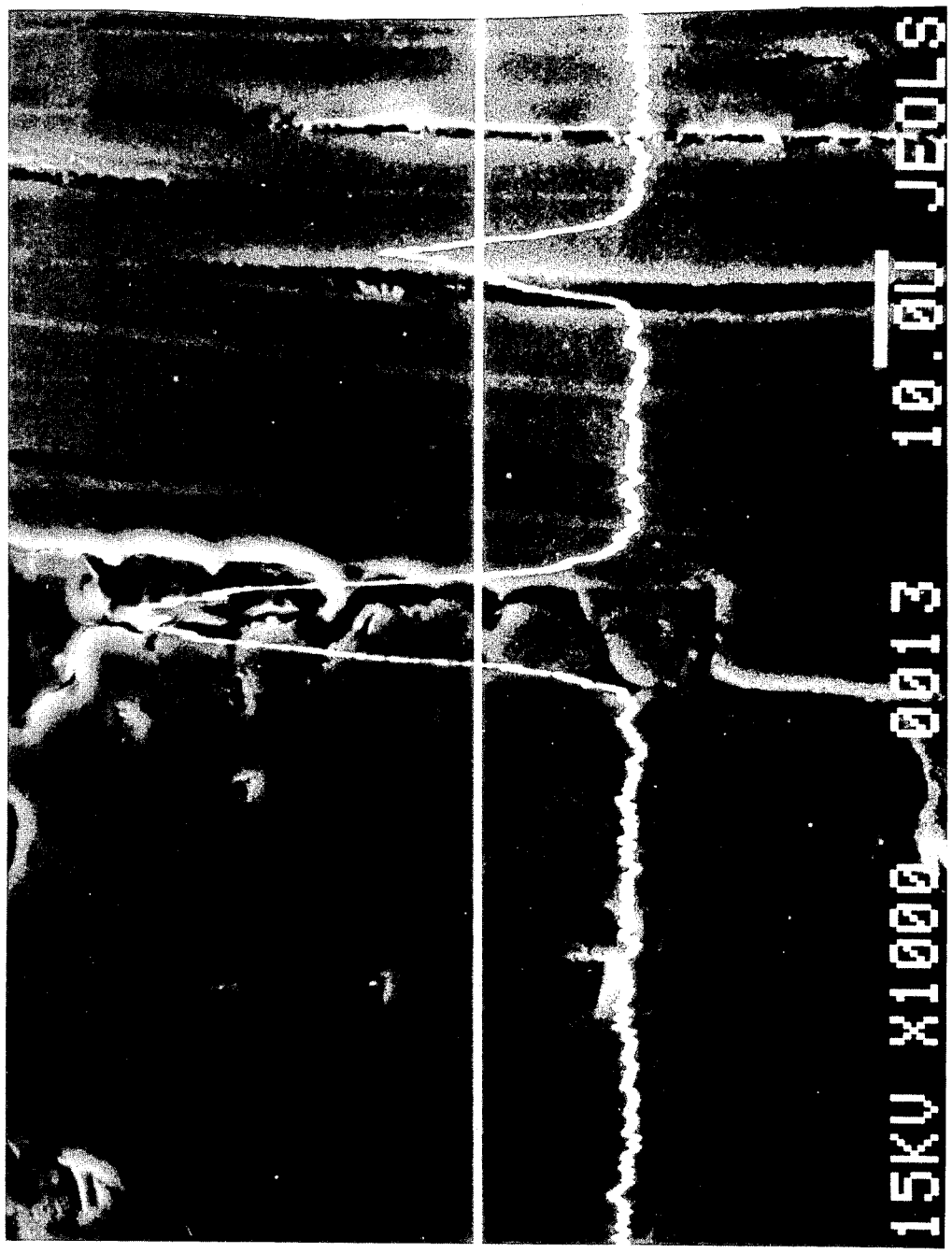
FIG. 3 is a further enlargement of a Wavelength Dispersive Spectrometry map of a cross-section of a CVI processed carbon composite material.

FIGS. 1-3, which are discussed in detail in the examples which follow, clearly show the ability of the method of this invention to deposit boron on the walls of the pores of carbon composite materials. Results of the CVI process of the present invention are clearly different from the surface coating which generally results from conventional chemical vapor deposition processes.

Figure 4:
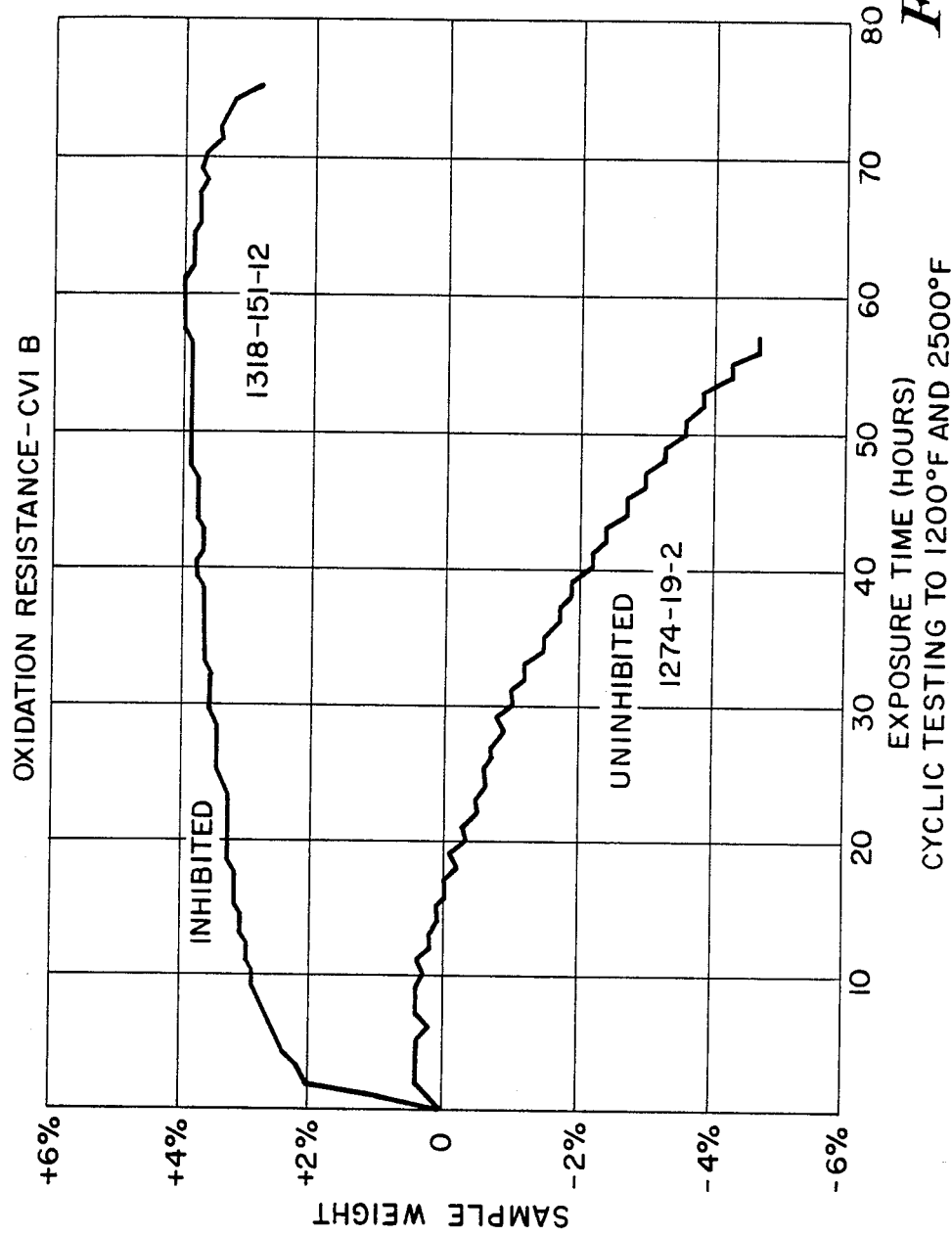
FIG. 4 is a graph plotting the change in sample weight with time during cyclic testing of the CVI infiltrated carbon composite material in accordance with this invention (Curve A), as compared with a carbon composite material not CVI processed (Curve B).

Carbon composite materials treated according to the method of the present invention exhibit penetration of the boron into the pores of the composite and deposition of boron as a solid on the walls of the pores of the composite material. The resulting composite, when coated with a silicon carbide-based ceramic coating and subjected to cyclic oxidation testing, shows virtually no degradation and weight loss until the sixtieth hour of cyclic oxidation testing, as compared to the rapid onset of weight loss in a control sample with the same coating but no inhibitor. (FIG. 4)

The invention is further illustrated by the following examples.

EXAMPLE 1

Four carbon composites, each measuring four inches by one-half by 0.150 inch and having bulk densities of approximately 1.44 gm/cc were placed in a CVD reactor and heated to 1200° C. under vacuum to outgas water vapor and other contaminants. The reactor was then filled with hydrogen gas to a total pressure of 800 Torr absolute while the temperature was lowered to 1000° C. A gas flow of 0.02 liter/minute of boron trichloride and 2.0 liters/min. of hydrogen was initiated. This 1:100 mixture of $BCl_3:H_2$ corresponds to a $BCl_3$ partial pressure of approximately 8 Torr in the gas stream. The volume of the reaction chamber was approximately 1.5 liters, resulting in flushing of the chamber volume in one to two minutes with a 2 liter/min. total gas flow.

These conditions were maintained for one hour, after which time the samples were removed and weighed. Boron weight pick-ups ranged from 0.8% original sample weight to 1.4% for the four samples. The samples were reinserted into the reactor chamber and the process was repeated for one more hour. Total sample weight gains after these two runs ranged from 1.8% to 2.3%.

A sample with 1.9% total boron weight gain was sectioned, mounted and polished to facilitate Scanning Electron Microscopic (SEM) examination. FIG. 1 is a secondary electron image of the sample cross-section. Several layers of graphite fiber bundles are visible, with the sample surface being located in the far left hand side of FIG. 1. The trace near the bottom of the photograph corresponds to boron concentration measured along the white line in the center of the photograph. The peaks in the boron trace demonstrate a high concentration of boron on the left at the composite's surface and additional concentrations at each successive fiber bundle interface.

FIG. 2 is a Wavelength Dispersive Spectrometry (WDS) map of the same view showing boron concentration. It shows a concentration of boron located on the sample surface, as well as boron concentrations lining major pore channels in the sample interior.

FIG. 3 is further enlargement of an area approximately 10 mils (0.010") from the surface. The while line across the center shows where the boron concentration line scan was done using WDS. The boron concentration profile shows high concentrations at the continuous pore channel between X and Y fiber bundles and a lower concentration lining a large continuous pore inside one of the fiber bundles. This experiment clearly demonstrated the ability of this invention to infiltrate inhibitor into the interior of a fibrous composite, as opposed to producing a surface coating, as normally results from conventional CVD processes.

EXAMPLE 2

In another application of this invention, two carbon composite samples each measuring approximately 3.73"×0.50"×0.135" and having bulk densities of approximately 1.45 gm/cc were infiltrated in multiple cycles to achieve total boron concentration in the 5-10% range. The temperature in each of the eleven cycles was maintained at 1035° C. $BCl_3$ flow rates ranged from 0.02 liter/min to 0.05 liter/min and $H_2$ flows were kept at 1.0 liter/min., resulting in boron trichloride partial pressures of 16 Torr to 40 Torr. These samples were then coated with silicon carbide based ceramic coatings and subjected to cyclic oxidation testing.

As shown in FIG. 4, the boron inhibitor functioned effectively in reducing the materials oxidation rate as compared to a control sample with the same coating but no inhibitor. The initial weight gain of the inhibited material is due to the gettering effect of boron, which combines with free oxygen to form boric oxide, increasing the sample weight. The control sample also shows some weight gain due to a small amount of boron applied during the coating process. The inhibitor effectively prevented sample degradation and weight loss until the sixtieth hour of testing, as compared to the very rapid onset of weight loss in the control sample.

This example demonstrates the invention's ability to reduce carbon/carbon oxidation rate when used in combination with a silicon carbide surface coating.

EXAMPLE 3

In a third example of this invention, carbon composites of two different densities were infiltrated in a single series of CVI runs. The four samples each measured 3.5"×0.50"×0.14". Two samples had bulk densities of 1.61 gm/cc and two had densities of 1.47 gm/cc. Similar operating conditions were maintained for all ten runs: hydrogen flow of 1.0 liter/minute; boron trichloride flow of 0.05 liter/minute; temperature of 1035° C.; total pressure of approximately 850 Torr absolute; and individual run times of one to three hours. Coating build-up on sample surfaces was removed after approximately every other run to facilitate boron infiltration into the sample interior. Total boron content after the ten runs is estimated at 3-5 weight percent for the high density samples and approximately 10 weight percent for the low density samples. This series of experiments demonstrated the ability of this invention to infiltrate both low density and high density carbon composites.

Chemical Vapor Infiltration (CVI) of boron is clearly distinguishable from Chemical Vapor Deposition (CVD) and Chemical Vapor Reaction (CVR) processes. In CVD and CVR processes, some penetration of the sample surface takes place. The distinguishing feature here is that given a porous composite, the depth of penetration achieved by CVI is typically greater than 5 mils and generally 10 to 100 mils without degrading fiber properties.

Industrial Applicability

This invention has industrial utility in the aerospace and aviation field, particularly where there is a need for a material with improved oxidation resistance at elevated temperatures. It is especially promising in its potential utility in components for turbine engines, rocket engines and braking systems. The invention allows dispersion of the oxidation inhibitor to those area where it is most likely to be needed to provide oxidation protection. In addition, the use of relatively low temperatures in the process prevents chemical attack of fibers in carbon composites by boron. As a result, the final composite exhibits higher strength than boron-containing composites processed at higher temperatures to achieve graphitization.

The combination of improved oxidation resistance and increased strength exhibited by the CVI processed composites makes them more well suited to application in aviation and aerospace technology than are composites not processed by the method of this invention.

Equivalents

Those skilled in the art will recognize, or be able to ascertain employing no more than routine experimentation, many equivalents to the specific components, steps and materials described specifically herein, and such equivalents are intended to be encompassed within the scope of the appended claims.

We claim:

1. A method of protecting porous carbon composite materials from oxidation, comprising the steps of:
    (a) heating a porous carbon composite material to a temperature of from about 900° C. to about 1200° C. in a reaction chamber under vacuum or in an inert atmosphere;

(b) introducing into said reaction chamber a gas mixture comprising a decomposable boron-containing gas and a diluent, the boron-containing gas in the gas mixture being at a low partial vapor pressure to slow the rate at which the boron-containing gas decomposes and deposits boron as a solid on the walls of the pores of said composite.

2. The method of claim 1 in which the porous carbon composite material has a porosity of greater than about 25 percent and pore size greater than about one micron.

3. The method of claim 1 in which the gas flow rates of the gaseous reactants result in a total pressure of about 800–900 Torr absolute and a partial pressure of the boron-containing gas of less than about 50 Torr.

4. A carbon composite material produced by the method of claim 1.

5. A carbon composite material produced by the method of claim 1 in which the depth of penetration is at least 5 mils.

6. A method of protecting porous carbon composite materials from oxidation, comprising the steps of:
   (a) heating a porous carbon composite material to a temperature of from about 900° C. to about 1200° C. in a reaction chamber under vacuum or in an inert atmosphere; and
   (b) contacting the heated composite with a gas mixture, said mixture comprising (i) a decomposable boron-containing gas and (ii) a diluent, and wherein the boron-containing gas is at a low partial vapor pressure to thereby slow the rate at which the boron-containing gas decomposes to deposit solid boron on the walls of the pores of said composite, the temperature of the mixture being lower than the temperature of the carbon composite material.

7. The method of claim 6 in which the porous carbon composite material has a porosity of greater than about 25 percent and pore size greater than one micron.

8. The method of claim 6 in which the gaseous by products of the reaction between the boron-containing gas and hydrogen are removed by means of an excess diluent gas.

9. The method of claim 8 in which the inert diluent gas is hydrogen, helium, nitrogen or argon.

10. A carbon composite material produced by the method of claim 6.

11. A carbon composite material produced by the method of claim 6 in which the depth of penetration is at least 5 mils.

12. A method of protecting porous carbon composite materials from oxidation, comprising the steps of:
   (a) heating a porous carbon composite material to a temperature of about 1200° C. under vacuum or in an inert atmosphere in a reaction chamber;
   (b) introducing into the reaction chamber an inert gas to a total pressure of about 800 Torr absolute;
   (c) lowering the temperature of the composite to between about 1000° C. and about 1050° C.;
   (d) introducing into the chamber a gaseous mixture, comprising a boron-containing gas and diluent, whose temperature is less than the temperature of the carbon composite and whose flow rate corresponds to a partial pressure of the boron-containing gas of less than about 50 Torr.

13. The method of claim 12 in which the porous carbon composite material has a porosity of greater than about 25 percent and pore size greater than about one micron.

14. The method of claim 12 in which the gaseous by-products of the reaction between the boron-containing gas and hydrogen are removed by means of an excess diluent gas.

15. The method of claim 14 in which the diluent gas is hydrogen, helium, nitrogen or argon.

16. A carbon composite material produced by the method of claim 12.

17. A carbon composite material produced by the method of claim 12 in which the depth of penetration is at least 5 mils.

18. A method of protecting porous carbon composite materials from oxidation, comprising the steps of:
   (a) heating a porous carbon composite material to a temperature of from about 900° C. to about 1200° C. under vacuum or in an inert atmosphere in a reaction chamber;
   (b) introducing into the reaction chamber gas to a total pressure of about 800 Torr absolute;
   (c) lowering the temperature of the composite to between about 1000° C. and about 1050° C.;
   (d) introducing into the chamber a gaseous mixture, comprising a boron-containing gas and a diluent, whose temperature is less than the temperature of the carbon composite; and
   (e) maintaining the temperature, flow rates and pressure of the gaseous mixture such that the rate of infiltration of the carbon composite is about one percent by weight per hour.

19. The method of claim 18 in which the porous carbon composite material has a porosity of greater than about 25 percent and pore size greater than about one micron.

20. The method of claim 18 in which the gaseous by-products of the reaction between the boron-containing gas and hydrogen are removed by means of an excess diluent gas.

21. The method of claim 20 in which the diluent gas is hydrogen, helium, nitrogen or argon.

22. A carbon composite material produced by the method of claim 18.

23. A carbon composite material produced by the method of claim 18 in which the depth of penetration is at least 5 mils.

* * * * *